US012565137B2

(12) United States Patent
Benamar

(10) Patent No.: US 12,565,137 B2
(45) Date of Patent: Mar. 3, 2026

(54) METHOD FOR CONTROLLING A LIGHTING SYSTEM USING A NON-GLARE LIGHTING FUNCTION

(71) Applicant: VALEO VISION, Bobigny (FR)

(72) Inventor: Fatima Benamar, Bobigny (FR)

(73) Assignee: Valeo Vision, Bobigny (FR)

( * ) Notice: Subject to any disclaimer, the term of this patent is extended or adjusted under 35 U.S.C. 154(b) by 237 days.

(21) Appl. No.: 18/253,947

(22) PCT Filed: Nov. 22, 2021

(86) PCT No.: PCT/EP2021/082554
§ 371 (c)(1),
(2) Date: May 23, 2023

(87) PCT Pub. No.: WO2022/112192
PCT Pub. Date: Jun. 2, 2022

(65) Prior Publication Data
US 2024/0101019 A1 Mar. 28, 2024

(30) Foreign Application Priority Data

Nov. 30, 2020 (FR) ...................................... 2012394

(51) Int. Cl.
*B60Q 1/08* (2006.01)
*B60Q 1/10* (2006.01)
(Continued)

(52) U.S. Cl.
CPC ............. *B60Q 1/085* (2013.01); *B60Q 1/143* (2013.01); *G06V 10/141* (2022.01);
(Continued)

(58) Field of Classification Search
CPC ................ B60Q 2300/132; B60Q 1/10; B60Q 2300/112; B60Q 2300/136;
(Continued)

(56) References Cited

U.S. PATENT DOCUMENTS 9,981,593 B2 5/2018 Mayer
10,493,902 B2 12/2019 Hennes et al.
(Continued)

FOREIGN PATENT DOCUMENTS

CN 109716196 A 5/2019
CN 109987020 A 7/2019
(Continued)

OTHER PUBLICATIONS

A1 (Hella KGAA Hueck & Co [De]) Dec. 2, 2009 (Dec. 2, 2009) Author: Hoffmann Ingo (Year: 2009).*
(Continued)

*Primary Examiner* — Wei (Victor) Y Chan
(74) *Attorney, Agent, or Firm* — Valeo Vision

(57) ABSTRACT
A method for controlling a lighting system of a motor vehicle, the lighting system with a plurality of elementary light sources each selectively controllable in order to emit an elementary light beam, the method includes detecting a road sign by a sensor system of the motor vehicle; estimating a passing duration between the instant the road sign is detected and a future instant at which the motor vehicle will pass the detected road sign; controlling the elementary light sources of the lighting system of the host vehicle in order to emit a pixelated light beam, with a portion of the elementary light sources being controlled, as a function of the passing duration, in order to generate a lower intensity zone extending in the vicinity of the road sign.

6 Claims, 3 Drawing Sheets

(51) Int. Cl.

| | |
|---|---|
| *B60Q 1/14* | (2006.01) |
| *G06V 10/141* | (2022.01) |
| *G06V 20/58* | (2022.01) |

(52) U.S. Cl.

CPC ...... *G06V 20/582* (2022.01); *B60Q 2300/054* (2013.01); *B60Q 2300/45* (2013.01)

(58) Field of Classification Search

CPC .... B60Q 2300/324; B60Q 1/115; B60Q 1/12; B60Q 1/122; B60Q 1/143; B60Q 1/18; B60Q 2200/38

See application file for complete search history.

(56) References Cited

U.S. PATENT DOCUMENTS

| | | | |
|---|---|---|---|
| 10,981,493 B2 | 4/2021 | Muramatsu et al. | |
| 11,028,992 B2 | 6/2021 | Lefaudeux et al. | |
| 2016/0311362 A1* | 10/2016 | Fendt ..................... | B60Q 1/085 |
| 2016/0377251 A1* | 12/2016 | Kim ......................... | B60Q 1/14 362/466 |
| 2020/0282897 A1* | 9/2020 | Muramatsu .......... | B60Q 1/0023 |
| 2020/0377007 A1* | 12/2020 | Fujiyama ............... | H05B 45/20 |
| 2020/0398736 A1* | 12/2020 | Kim ......................... | B60Q 1/08 |
| 2020/0398737 A1* | 12/2020 | Fujiyama ............. | H05B 47/125 |

FOREIGN PATENT DOCUMENTS

| | | | |
|---|---|---|---|
| DE | 102007048717 A1 | 4/2009 | |
| DE | 102007049717 A1 | 4/2009 | |
| EP | 2127944 A1 | 12/2009 | |
| EP | 2479064 A1 | 7/2012 | |
| FR | 3055981 A1 | 3/2018 | |
| JP | 2010111261 A | 5/2010 | |
| JP | 201634785 A | 3/2016 | |
| JP | 2018103905 A | 7/2018 | |
| JP | 2018118614 A | 8/2018 | |
| JP | 2020142615 A | 9/2020 | |
| WO | 2012017559 A1 | 2/2012 | |
| WO | 2020100638 A1 | 5/2020 | |

OTHER PUBLICATIONS

A1 (Hella KGAA Hueck & Co [De]) Dec. 2, 2009 (Dec. 2, 2009) (Translation) Author: Hoffmann Ingo (Translation) (Year: 2009).*

A1 (Valeo Vision [FR]) Mar. 16, 2018 (Mar. 16, 2018), Author: Lefaudeux Nicolas (Year: 2018).*

European Patent Office, International Search Report (with English translation) and Written Opinion of corresponding International Application No. PCT/EP2021/082554, dated Jan. 21, 2022.

Japan Patent Office, Office Action (with English translation) of corresponding Japanese Application No. 2023-532772, dated Jun. 4, 2024.

China Patent Office, Office Action (with English translation) of corresponding Chinese Application No. 202180076277.0, dated Apr. 29, 2025, 15 pages.

China Patent Office, Search Report of corresponding Chinese Application No. 202180076277.0, dated Apr. 29, 2025, 2 pages.

Japan Patent Office, Office Action (with English translation) of corresponding Japanese Patent Application No. 2023-532772, dated Dec. 24, 2024.

Japan Patent Office, Search Report (with English translation) of corresponding Japanese Patent Application No. 2023-532772, dated May 31, 2024.

* cited by examiner

METHOD FOR CONTROLLING A LIGHTING SYSTEM USING A NON-GLARE LIGHTING FUNCTION

TECHNICAL FIELD

The invention relates to the field of motor vehicle lighting. More specifically, the invention relates to a method for controlling a lighting system of a motor vehicle using an anti-glare lighting function.

BACKGROUND OF THE INVENTION

A motor vehicle is usually equipped with a lighting system allowing, among other things, a lighting function of the regulatory main beam type to be emitted that is capable of optimally illuminating the road downstream of the vehicle.

Whilst this type of beam allows the visibility of the driver to be satisfactorily increased, it also can be a source of discomfort for the driver. Indeed, the main beam lighting beam can reach a road sign and can be retroreflected toward the driver. This retroreflection then can be a source of glare, especially if the sign is provided with reflection means, if the light power of the lighting beam is particularly high, if the ambient brightness is already high or even if the driver is sensitive to glare.

It is known for motor vehicles to be equipped with a sensor system for detecting a road sign on the road and with a controller capable of switching the lighting system for emitting a non-glare beam, for example, of the passing-beam type, when this sign is detected. In this way, the source of glare is removed in order to eliminate the discomfort of the driver.

However, this solution is unsatisfactory. On the one hand, emitting such a non-glare beam also reduces the illumination of the rest of the road, such that the visibility of the driver is no longer optimal. Furthermore, the road sign is no longer illuminated and the driver is no longer able to perceive it and to understand it. Finally, modern vehicles are usually equipped with a camera allowing driving assistance functions to be implemented, which can require the camera reading the sign. In this case, the camera is also unable to read this sign, due to the lack of lighting on this sign, which can thus cause the driving assistance functions to fail.

SUMMARY OF THE INVENTION

A requirement exists for a solution that overcomes the various cited disadvantages, and that particularly allows a lighting beam to be emitted that is capable of optimally illuminating the road, including a road sign, yet without generating a source of glare for the driver in the vicinity of this sign.

The present invention falls within this context and aims to address this requirement.

To this end, the aim of the invention is a method for controlling a lighting system of a motor vehicle, the lighting system comprising a plurality of elementary light sources each selectively controllable in order to emit an elementary light beam, the elementary light beams together forming a pixelated light beam, the method comprising the following steps:

a. detecting a road sign by a sensor system of the motor vehicle;

b. estimating a passing duration between the instant the road sign is detected and a future instant at which the motor vehicle will pass the detected road sign;

c. controlling the elementary light sources of the lighting system of the host vehicle in order to emit a pixelated light beam, with a portion of the elementary light sources being controlled, as a function of said passing duration, in order to generate a lower intensity zone in the light beam extending in the vicinity of the road sign.

By virtue of the invention, and in particular by virtue of the use of a lighting system capable of emitting a pixelated light beam, it is possible to illuminate the entire road downstream of a motor vehicle, including in the vicinity of a road sign, while emitting less light in the vicinity of this sign in order to avoid retroreflection on this sign that would dazzle the driver. Moreover, it has been found that estimating the duration separating the instant of detecting the road sign and a future instant at which the motor vehicle will pass the detected road sign allows the amount of light that must be emitted toward this sign to be precisely and intelligently controlled, so as to optimize the detection and the comprehension of this sign by the driver or by a camera of the motor vehicle.

A lower intensity zone is understood to be a zone illuminated by all the elementary light beams emitted by the elementary light sources of said portion, with each elementary light beam emitted by an elementary light source in this zone having a light intensity lower than the nominal light intensity likely to be emitted by this elementary light source. For example, the light intensity of this elementary light beam can be substantially lower than the light intensity of each of the elementary light beams forming the rest of the pixelated light beam.

Advantageously, the step of detecting the road sign can be carried out by a camera on board the motor vehicle.

In one embodiment of the invention, during the detection step, the sensor system estimates a distance separating the motor vehicle from the road sign, and, during the step of estimating the passing duration, the passing duration is estimated as a function of said distance and of the speed of the host motor vehicle. If desired, the sensor system estimates a distance separating the sensor system from the road sign and an angle between the sensor system and the road sign, and, during the step of estimating the passing duration, the passing duration is estimated as a function of said distance, of said angle and of the speed of the motor vehicle.

In another embodiment of the invention, during the detection step, the sensor system determines an illumination of the road sign by the lighting system. If applicable, during the step of estimating the passing duration, a distance separating the motor vehicle from the road sign is estimated as a function of the determined illumination and of the light intensity emitted by the lighting system toward the sign, and, during the step of estimating the passing duration, the passing duration is estimated as a function of said distance and of the speed of the host motor vehicle. The method according to the invention thus can be deployed on vehicles equipped with low-performance sensor systems. For example, in the case whereby the sensor system comprises a camera capable of acquiring an image of the road, the illumination of the road sign can be determined using the intensity of each of the pixels of this image located in the vicinity of the road sign or on the basis of the brightness of the road sign that this camera could estimate. With the light intensity emitted by the directional lighting system being known in advance, since it is the setpoint of the elementary light sources, it is possible, for example, to compute the distance separating the motor vehicle from the road sign by means of Bouguer's law, formulated according to the following equation.

$$E = \frac{I \cdot \cos(\theta)}{d^2} \qquad \text{Math 1}$$

Where E is the illumination of the road sign by the lighting system, I is the light intensity emitted by the lighting system toward the road sign, d is the distance separating the motor vehicle from the road sign and θ is the angle between the normal to the surface of the road sign and the emission direction of the lighting system, which can be considered to be zero.

Advantageously, the method can comprise a step of estimating a glare level of a driver of the motor vehicle by the road sign and of comparing this glare level with a given glare threshold, with the step of controlling elementary light sources in order to generate said lower intensity zone in the light beam being conditional upon the fact that the glare level is greater than the given glare threshold. According to this feature, it is thus possible to not activate the anti-glare function of the road sign, when this road sign is not considered to be dazzling. In this case, the road sign is therefore illuminated by the pixelated light beam with a nominal intensity.

It is possible, for example, to determine the brightness of the road sign, and to then estimate the glare level from the logarithm of this brightness. This glare level is particularly defined according to the De Boer scale, which describes the intensity of a perceived discomfort, by means of the following values: 1 (hardly noticeable), 3 (just acceptable), 5 (disturbing), 7 (satisfactory), 9 (unbearable). Said glare threshold can be set to 3, for example.

In an alternative or cumulative example, the sensor system can estimate the brightness of the road sign and the dimensions of the road sign, with the step of controlling elementary light sources in order to generate said lower intensity zone in the light beam being conditional upon the fact that the brightness of the road sign is greater than a given threshold and on the fact that the dimensions of the road sign are greater than a given threshold.

Advantageously, the method comprises a step of comparing the passing duration, particularly estimated on completion of the step of detecting the road sign, with a minimum threshold. If the passing duration is less than said minimum threshold, during the step of controlling the elementary light sources, each elementary light source of said portion intended to generate the lower intensity zone is controlled in order to emit an elementary light beam with constant intensity as the motor vehicle moves toward the road sign. According to this feature, when the motor vehicle is too close to the road sign, the light intensity emitted toward the road sign is reduced to a constant value that is not likely to generate a dazzling retroreflection but is just enough to allow the road sign to be perceived and understood by the driver or a camera of the motor vehicle. For example, said constant intensity can range between 20% and 30%, and in particular can be equal to 26%, of the nominal light intensity likely to be emitted by this elementary light source.

Advantageously, the method comprises a step of comparing the passing duration, particularly estimated on completion of the step of detecting the road sign, with a minimum threshold. If the passing duration is greater than said minimum threshold, during the step of controlling the elementary light sources each elementary light source of said portion intended to generate the lower intensity zone is controlled in order to emit an elementary light beam, the intensity of which decreases as the motor vehicle moves toward the road sign. By virtue of this feature, it is possible to ensure that the brightness of the road sign, caused by the lighting system illuminating the road sign, is decreasing as the time interval between the future instant at which the motor vehicle will pass the road sign and the present instant decreases. This ensures that the illumination of the road sign is insufficient to dazzle the driver by retroreflection but is sufficient for the driver or a camera to be able to perceive and understand the road sign while the motor vehicle is moving. Still advantageously, when the passing duration falls below a given minimum threshold, during the step of controlling the elementary light sources, each elementary light source of said portion intended to generate the lower intensity zone is controlled in order to emit an elementary light beam of constant intensity as the motor vehicle moves toward the road sign.

Preferably, the method comprises a step of selecting a control law from among a plurality of control laws as a function of the value of the passing duration, with each control law defining the evolution of a light intensity to be emitted according to an increasing function of time. If applicable, each elementary light source of said portion intended to generate the lower intensity zone is controlled in order to emit an elementary light beam, the intensity of which is determined by means of the selected control law, as a function of the value of the time remaining before the motor vehicle passes the road sign. In other words, the time remaining before the motor vehicle passes the road sign is periodically estimated while the motor vehicle is moving, starting from the detection of the road sign, and the intensity of the light sources is redefined for each value of this remaining time. A plurality of lighting profiles of the road sign is thus defined by the lighting system, so as to optimize the perception and the comprehension of the road sign by the driver or a camera as the motor vehicle moves.

If desired, each control law of the plurality of control laws is associated with at least one distinct passing duration, and in particular a range of distinct passing durations. If applicable, the increasing function of each control law has a growth rate; and, for a first control law associated with a passing duration greater than the passing duration associated with a second control law, the growth rate of the increasing function of the first control law is lower than that of the second control law.

For example, the increasing function of each control law can be a power function of time, and the exponent of which is associated with the passing duration associated with this control law. This power function can be defined, for example, by the following equation:

$$I = \alpha_i \cdot ttc^{\beta_i} \qquad \text{Math 2}$$

Where I is the light intensity emitted by each elementary light source of said portion of the lighting system, ttc is a variable representing the time remaining before the motor vehicle passes the road sign and the value of which ranges between 0 and the passing duration, $\alpha_i$ is an amplitude of the power function associated with a control law i, and $\beta_i$ is an exponent of the power function associated with a control law i.

It is thus understood that the greater the estimated passing duration when detecting the road sign, the lower the exponent $\beta_i$ of the power function of the control law that will be selected and/or the greater the amplitude $\alpha i$ of the power function of the control law that will be selected. In this way, a fairly rapid reduction is thus guaranteed, as a function of this initial passing duration, of the brightness of the road sign toward the constant value. Advantageously, for each control law of said plurality of control laws, the exponent $\beta_i$ of the power function associated with this control law is less than 2.

Advantageously, during the step of controlling the elementary light sources, the elementary light sources can be controlled to emit a pixelated light beam of the non-glare, main beam type.

Preferably, during the step of controlling the elementary light sources, said portion of the elementary light sources can be controlled, as a function of said passing duration, in order to generate a zone in the light beam with edges that surround the road sign.

For example, the sensor system can be arranged to estimate, during the step of detecting the road sign, a pair of horizontal angles between the sensor system and the lateral ends of the road sign and/or a pair of vertical angles between the sensor system and the upper and lower ends of the road sign. If applicable, the method can comprise a step of determining a pair of horizontal and/or vertical angles between the lighting system and said lateral and/or upper and lower ends, for example, by means of a reference replacement operation. The elementary light sources of said portion that must be controlled in order to generate said lower intensity zone are then the elementary light sources capable of emitting an elementary light beam, the emission cone of which is horizontally and/or vertically at least partially included in the range defined by the pairs of previously determined horizontal and/or vertical angles. Advantageously, these steps of determining pairs of angles and of controlling the elementary light sources are periodically renewed while the motor vehicle moves, so that the edges of the zone surround the road sign during this movement.

Advantageously, said portion of the elementary light sources is controlled in order to generate, in the light beam, a lower intensity zone throughout the duration of travel of the motor vehicle between the instant of detecting the road sign and the future instant at which the motor vehicle will pass the detected road sign. If applicable, after the motor vehicle has passed the road sign, said portion of the elementary light sources can be controlled in order to each generate a nominal intensity elementary light beam.

A further aim of the invention is a motor vehicle comprising a sensor system, a lighting system and a controller, with the controller, the sensor system and the lighting system being arranged to implement the method according to the invention.

Advantageously, the lighting system comprises a plurality of selectively controllable elementary light sources, with each elementary light source being able to emit an elementary light beam, in particular with a vertical angular aperture of less than 1°. If applicable, all the elementary light sources may be able to emit a pixelated light beam extending horizontally in a range from −16° to +16° and vertically in a range from −1° to +6° around the horizon.

In one embodiment of the invention, the lighting system comprises a light module comprising a pixelated light source comprising a plurality of elementary emitters arranged in a matrix, with each of the elementary emitters forming an elementary light source and being selectively activatable in order to emit an elementary light beam, and an optical projection element associated with said pixelated light source in order to project each of said elementary light beams onto the road. For example, the pixelated light source comprises at least one matrix of light-emitting elements (called monolithic array), and in particular at least one matrix of monolithic light-emitting elements, also called monolithic array.

As an alternative embodiment, the light module can comprise a light source formed, for example, by at least one light-emitting diode emitting light and a matrix of optoelectronic elements, and, for example, a matrix of micromirrors (also known as DMD (Digital Micromirror Device)), which directs the light rays originating from said at least one light source by reflection toward an optical projection element.

BRIEF DESCRIPTION OF DRAWINGS

The present invention will now be described using examples that are illustrative only and that by no means limit the scope of the invention, and from the accompanying drawings, in which the various figures show.

DETAILED DESCRIPTION OF THE INVENTION

Throughout the following description, elements that are identical in terms of structure or in terms of function and that appear in various figures have been designated with the same reference sign, unless otherwise indicated.

Figure 1:
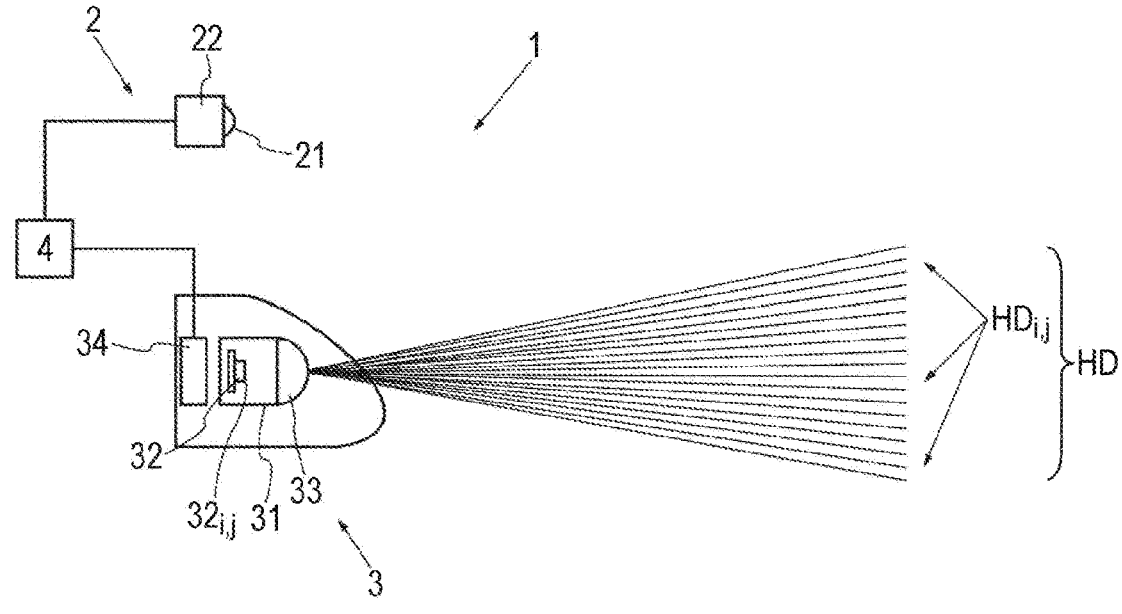
FIG. 1 schematically and partially shows a motor vehicle according to one embodiment of the invention.

FIG. 1 shows a partial view of a motor vehicle 1 according to one embodiment of the invention. The motor vehicle 1 comprises a sensor system 2 comprising a camera 21 arranged to acquire images of the road downstream of the motor vehicle. The sensor system 2 further comprises a computer 22 arranged to implement various methods for processing the images acquired by the camera 21.

The motor vehicle 1 further comprises a lighting system 3 comprising a light module 31. The light module 31 particularly comprises a pixelated light source 32 associated with a lens 33. In the example described, the pixelated light source 32 is a monolithic pixelated light-emitting diode, for which each of the light-emitting elements forms an elementary light source $32_{i,j}$ that can be activated and selectively controlled by an integrated controller for emitting light toward the lens 33, which thus projects an elementary light beam $HD_{i,j}$ onto the road, the light intensity of which is controllable. Each elementary light beam $HD_{i,j}$ is projected by the lens into a given emission cone, defined by a given emission direction and a given angular aperture. Thus, in the example described, all the elementary light beams $HD_{i,j}$ thus form a pixelated light beam HD having 500 pixels distributed over 25 columns and 20 rows, extending horizontally over an angular horizontal range of ~16° to +16° and vertically over an angular vertical range of −1° to +6° and each pixel of which is formed by one of these elementary light beams $HD_{i,j}$. Each elementary light beam $HD_{i,j}$ emitted by one of the elementary light sources $32_{i,j}$ of the source 32 has a horizontal and vertical aperture of less than 1°.

The light module 31 comprises a controller 34 arranged to control the integrated controller of the pixelated light source 32 so as to selectively control the turning-on, the turning-off and the modification of the light intensity of each of the elementary light beams $HD_{i,j}$, as a function of instructions received from a computer 4 of the host vehicle 1, with these instructions being particularly determined from the information provided by the computer 22 of the sensor system 2.

Figure 2:
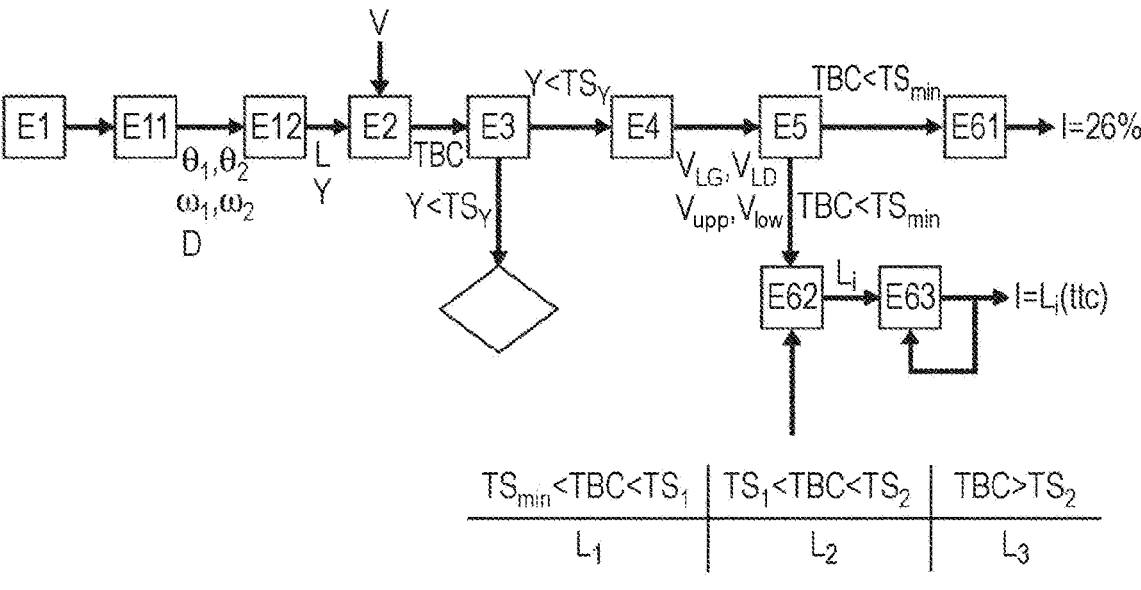
FIG. 2 shows a method according to one embodiment of the invention, implemented by the motor vehicle of FIG. 1.
Figure 3:
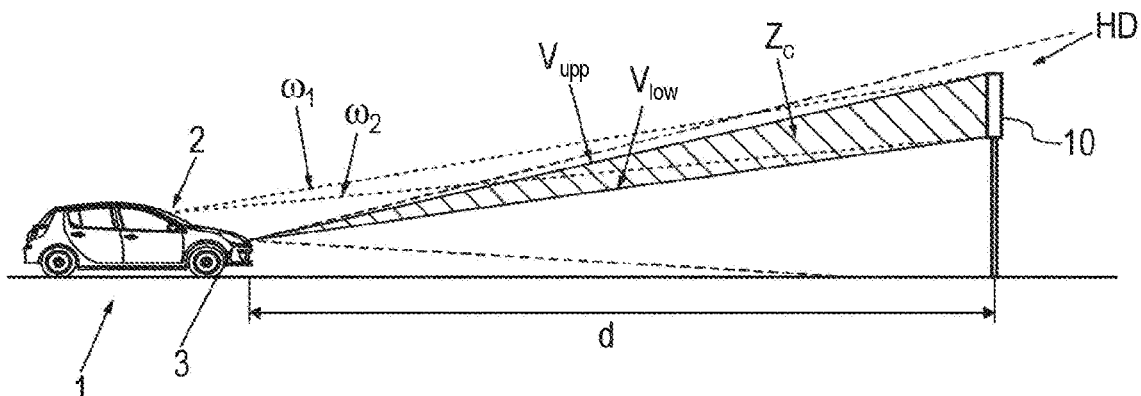
FIG. 3 shows a side view of a road scene when the vehicle of FIG. 1 implements the method of FIG. 2.
Figure 4:
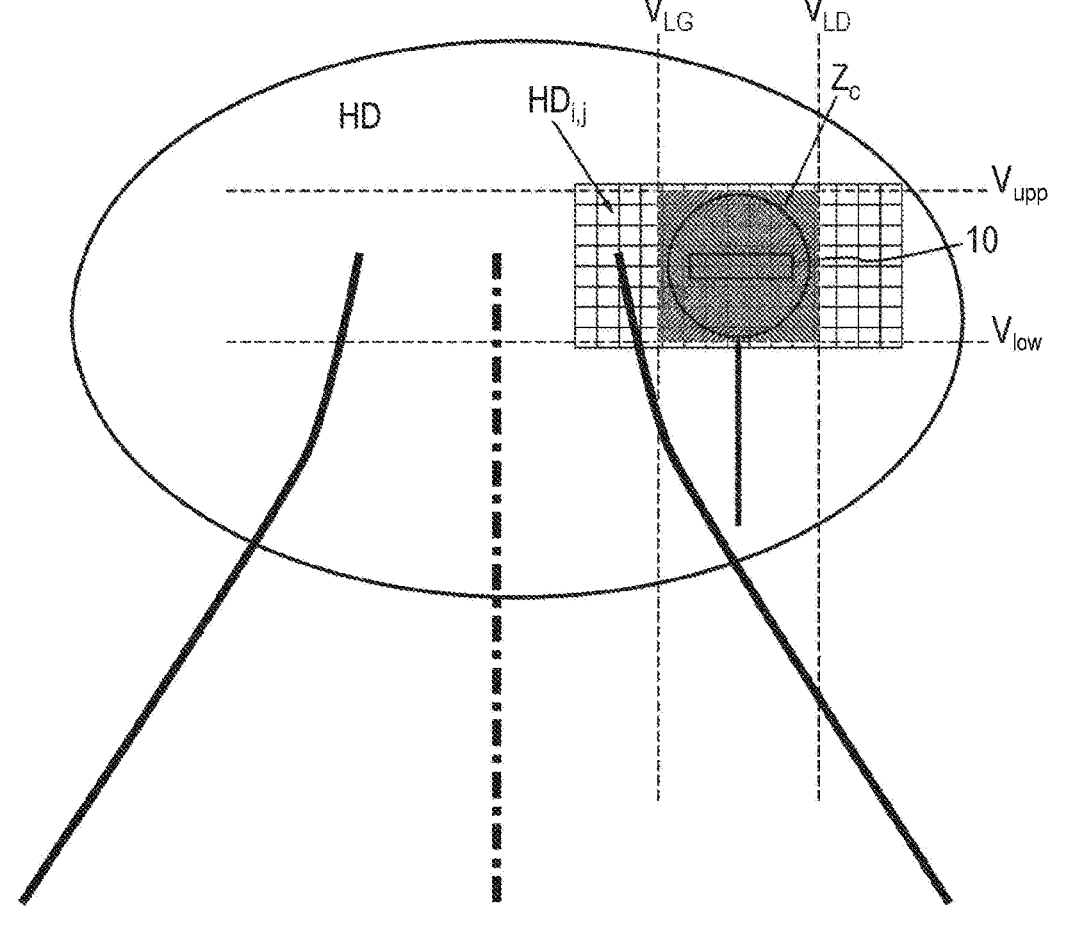
FIG. 4 shows a front view of a road scene when the vehicle of FIG. 1 implements the method of FIG. 2.

FIG. 2 shows a method for controlling the lighting system 3 according to one embodiment of the invention. This method will be described with reference to FIG. 3 and FIG. 4, which respectively describe a side view and a front view of a road scene when implementing the method of FIG. 2.

In a step E1, the sensor system 2 detects a road sign 10 on the road. A road sign 10 has a generally circular, triangular, or rectangular shape, is generally provided with a reflective coating and includes inscriptions and/or pictograms. It is thus possible to detect the presence of such a sign on an image acquired by the camera 21, in particular due to the fact that the ambient light and the light emitted by the various road users are reflected toward the camera 21. The computer 22 is thus provided with means for processing the image allowing this detection.

Following the detection, the computer 22 determines, in a step E11, various features of the road sign 10 and in particular:

a. horizontal angles $\theta_1$ and $\theta_2$ between the camera 21 and the lateral ends of the road sign 10;

b. vertical angles $\omega_1$ and $\omega_2$ between the camera 21 and the upper and lower ends of the road sign 10;

c. a distance d separating the camera 21 from the road sign 10.

In a step E12, the computer 22 determines the brightness L of the road sign 10 that is generated by the retroreflection of the light emitted by the lighting system 3.

Finally, this brightness L allows the computer to estimate, in this same step, a glare level Y from the logarithm of this brightness L, brought back to a range from 1 to 10, corresponding to the De Boer scale.

The computer 4 is provided with the set of parameters, which computer estimates, in a step E2, from the distance d determined at the instant t0 the road sign 10 was detected by the sensor system 2, a passing duration TBC separating this instant t0 from a future instant t1 at which the motor vehicle 1 will pass this road sign 10. This duration TBC particularly can be computed by means of the distance d and the speed v of the motor vehicle 1 at the instant to, with this speed v being known by the computer 4.

In a step E3, the glare level Y is compared with a given glare threshold $TS_Y$ on the De Boer scale, for example, with a value of 3.

In the case whereby the glare level Y is actually greater than this glare threshold $TS_Y$, the computer 4 determines, in a step E4, from the horizontal angles $\theta_1$ and $\theta_2$ and the vertical angles $\omega_1$ and $\omega_2$, horizontal angles $V_{LG}$ and $V_{LD}$ and vertical angles $V_{upp}$ and $V_{low}$ between the lighting system 3 and the upper and lower lateral ends, using a reference replacement operation. The computer 4 thus selects the elementary light sources $32_{i,j}$ capable of emitting an elementary light beam $HD_{i,j}$, the emission cone of which is horizontally and/or vertically at least partially included in the range defined by the previously determined pairs of angles $V_{LG}$ and $V_{LD}$ and $V_{upp}$ and $V_{low}$.

In a step E5, the passing duration TBC is compared with a minimum threshold $TS_{min}$.

If the passing duration TBC is less than the minimum threshold $TS_{min}$, the computer 4 sends, in a step E61, a control setpoint to the controller 34 so that each of the selected elementary light sources $32_{i,j}$ emits an elementary light beam HDi,j of constant intensity I, lower than the aforementioned nominal light intensity able to be emitted by this source, throughout the duration TBC. This constant intensity is equal, for example, to 26% of the nominal light intensity.

It is thus understood that the selected light sources $32_{i,j}$ together generate a lower intensity zone $Z_C$, with respect to the rest of the pixelated light beam HD, the edges of which surround the road sign 10. This zone $Z_C$ is kept activated and centered on the road sign 10 throughout the entire movement of the motor vehicle 1 between the instant $t_0$ and the instant $t_1$ (with the detection and the estimation of the horizontal and vertical angles $\theta_1$, $\theta_2$, $\omega_1$ and $\omega_2$ being periodically renewed during this movement).

If the passing duration TBC is lower than the minimum threshold $TS_{min}$, the computer 4 compares, in a step E62, the passing duration TBC with a plurality of passing duration ranges. In the example described, the passing duration TBC is compared with a first threshold $TS_1$ and with a second threshold $TS_2$ greater than $TS_1$, which thus define three ranges, namely $TS_{min}$-$TS_1$, $TS_1$-$TS_2$ and the durations greater than $TS_2$.

Each range is associated with a control law $L_1$, $L_2$, $L_3$, which for this range defines the evolution of a light intensity I according to an increasing function of the time remaining before the vehicle 1 passes the road sign 10.

In the example described, each function is a power function of the remaining time ttc, the exponent of which is predetermined as a function of the associated range. The remaining time ttc is thus a time variable with a value that decreases from the passing duration TBC until it reaches 0.

More specifically, the exponent $\beta_i$ of a law $L_i$ associated with a range $TS_i$-$TS_j$ is greater than the exponent $\beta_j$ of the law $L_j$ associated with a larger range $TS_j$-$TS_k$. In other words, the exponent $\beta_1$ of the law $L_1$ associated with the range $TS_{min}$-$TS_1$ is greater than the exponent $\beta_2$ of the law $L_2$ associated with the range $TS_1$-$TS_2$, which itself is greater than the exponent $\beta_3$ of the law $L_3$ associated with the range of durations greater than $TS_2$.

Figure 5:
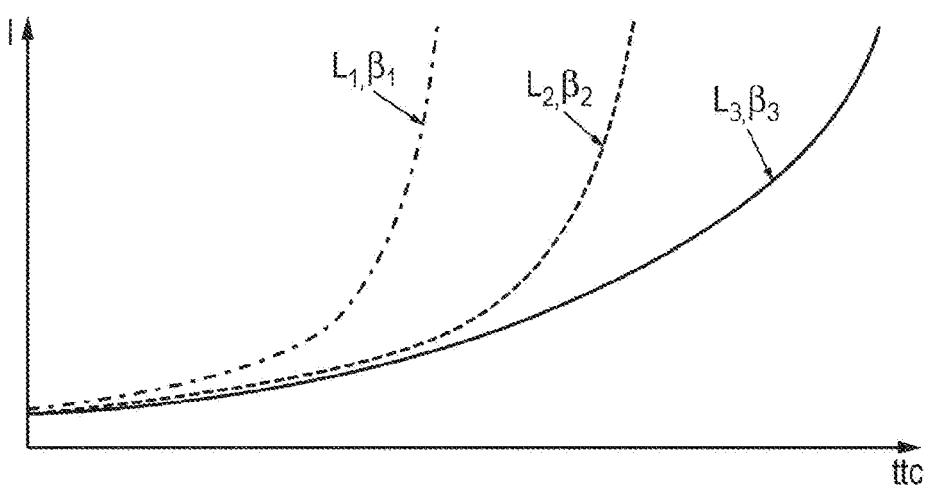
FIG. 5 shows examples of a control law used in the method of FIG. 2.

FIG. 5 shows these various functions of the laws $L_1$ to $L_3$ on the same graph. Therefore, it can be seen that the growth rate of $L_1$ is thus greater than the growth rate of $L_2$, which itself is greater than the growth rate of $L_3$.

In step E62, the computer 4 thus selects the law $L_i$ associated with the range in which the estimated value TBC is located when detecting the road sign 10. Then, periodically, in a step E63, the computer 4 estimates the remaining time ttc and sends a control setpoint to the controller 34 so that each of the selected elementary light sources $32_{i,j}$ emits an elementary light beam $HD_{i,j}$, the intensity I of which is determined by means of the selected law Li, as a function of the estimated remaining time ttc. It should be noted that if the remaining time ttc, estimated at a given instant, falls below the threshold $TS_{min}$, the setpoint issued by the computer 4 is the constant value of 26% for the rest of the movement in its entirety, as for step E61.

Figure 6:
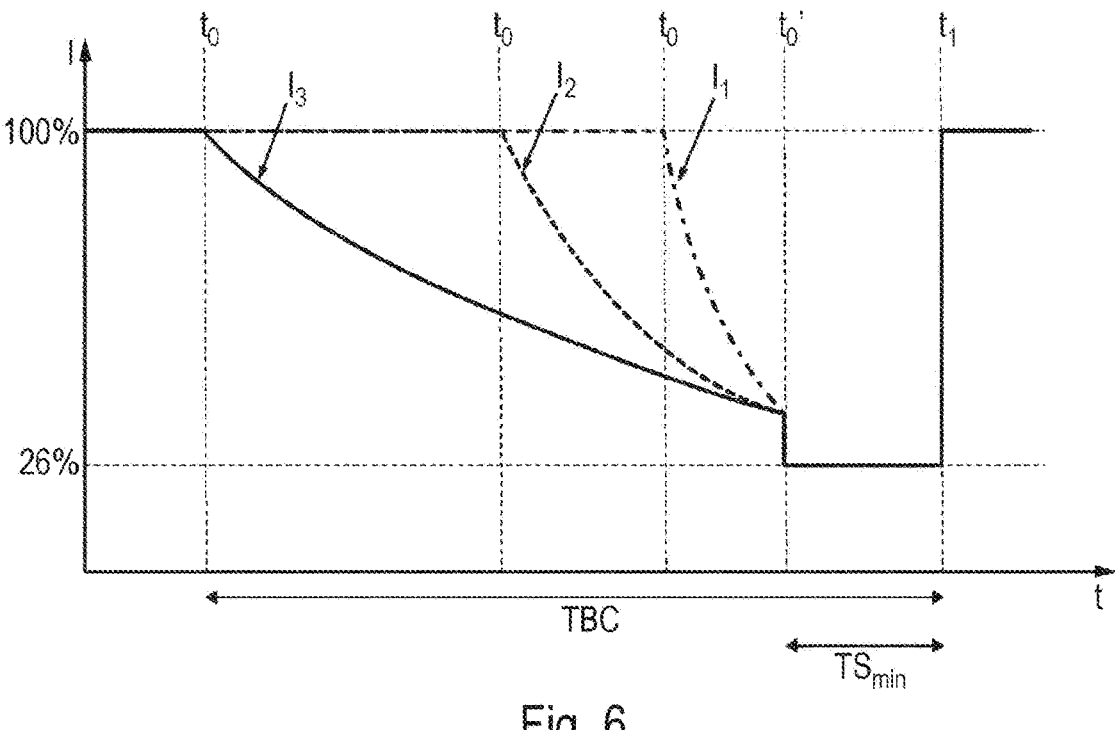
FIG. 6 shows examples of the implementation of the method of FIG. 2.

FIG. 6 shows three scenarios on the same graph for implementing the method according to the invention, for three different values of the passing duration TBC estimated when detecting the road sign at an instant $t_0$, with each of these values being located in a different range. Each curve $I_1$, $I_2$, and $I_3$ represents the light intensity, as a % of the nominal intensity, emitted by the selected elementary light sources $32_{i,j}$ in the zone $Z_C$, when the motor vehicle 1 is moving, with the abscissa representing the time. More specifically, the curve $I_1$ is obtained by means of the law $L_1$, the curve $I_2$ is obtained by means of the law $L_2$ and the curve $I_3$ is obtained by means of the law $L_3$.

Therefore, it can be seen that these intensities decrease from the instant $t_0$ at which the road sign 10 is detected, until an instant $t_0'$ at which the remaining time ttc falls below the threshold $TS_{min}$, with the light intensities then assuming a constant value of 26%. Once the time t1 is reached, with the value ttc therefore having reached 0 and the light sign 10 being passed, the light intensities can then return to a nominal value of 100%.

It also can be seen that, due to the use of the laws $L_1$, $L_2$ and $L_3$, the earlier the road sign 10 is detected, the lower the reduction in the light intensity emitted in the zone $Z_C$. It is thus possible to ensure optimum illumination of the road sign 10 when the motor vehicle 1 is moving, which allows the driver or the camera 21 to continue to perceive and to understand the road sign throughout this movement, yet without generating a retroreflection that would be dazzling.

It should be noted that the rest of the elementary light sources $32_{i,j}$ can implement a non-glaring road lighting function, in particular by attenuating or deactivating the elementary light sources $32_{i,j}$ capable of dazzling the driver of an oncoming or followed target motor vehicle.

The above description clearly explains how the invention allows its set objectives to be achieved, and in particular by proposing a method for controlling a lighting system of a vehicle that allows the detection and the comprehension of a road sign by the driver or a camera of the vehicle to be optimized while the vehicle is moving, yet without any risk of this sign generating a dazzling retroreflection.

In any event, the invention should not be regarded as being limited to the embodiments specifically described in this document, and extends, in particular, to any equivalent means and to any technically operative combination of these means. In particular, types of light modules other than that described can be contemplated, and in particular a light module comprising a combination of a light source and a matrix of selectively activatable micromirrors. It is also possible to contemplate estimating the distance separating the motor vehicle from the road sign, for example, from the illumination of the road sign measured by the sensor system and using Bouguer's law. It is also possible to contemplate a number of control laws different from that which has been described and/or of profiles of the functions of these control laws different from those that have been described.

What is claimed is:

1. A method for controlling a lighting system of a motor vehicle having a plurality of elementary light sources where each is selectively controllable in order to emit an elementary light beam, a number of the elementary light beams together forming a pixelated light beam, the method comprising:

detecting a road sign by a sensor system of the motor vehicle;

estimating a passing duration between an instant time until the road sign is detected and a future instant time at which the motor vehicle will pass the road sign that is detected;

comparing the passing duration with a minimum threshold;

controlling the elementary light sources of the lighting system of the motor vehicle in order to generate a lower intensity zone in the pixelated light beam extending in a vicinity of the road sign;

wherein a portion of the elementary light sources is controlled if the passing duration is less than a minimum threshold in order to emit the elementary light beam, with a light intensity of which decreases as the motor vehicle moves toward the road sign;

selecting a control law from among a plurality of control laws as a function of a value of the passing duration, where each control law defines an evolution of a light intensity to be emitted according to an increasing function of time;

wherein each elementary light source of a portion intended to generate the lower intensity zone is controlled in order to emit the elementary light beam;

wherein the light intensity to be emitted is determined by a means of the control law selected, as a function of a value of time remaining before the motor vehicle passes the road sign;

wherein each control law of said control laws is associated with at least one distinct passing duration such that the increasing function of time of each control law has a growth rate; such that a first control law associated with said passing duration is greater than a comparable passing duration associated with a second control law; and wherein the growth rate of the increasing function of the first control law is lower than that of the second control law.

2. The method of claim 1, wherein detecting the road sign includes the sensor system estimating a distance separating the motor vehicle from the road sign; wherein the step of estimating the passing duration includes estimating the passing duration as a function of the distance and of speed of the motor vehicle.

3. The method of claim 1, wherein detecting the road sign includes the sensor system determining an illumination of the road sign by the lighting system, estimating the passing duration includes estimating the passing duration, a distance separating the motor vehicle from the road sign is estimated as a function of the determined illumination and of the light intensity emitted by the lighting system toward the sign, and with the passing duration being estimated as a function of the distance and of the speed of the motor vehicle.

4. The method of claim 1, further comprising estimating a glare level of a driver of the motor vehicle by the road sign and of comparing this glare level with a given glare threshold, with controlling elementary light sources in order to generate the lower intensity zone in the light beam being conditional upon the fact that the glare level is greater than the given glare threshold.

5. The method of claim 1, wherein a portion of the elementary light sources intended to generate the lower intensity zone is controlled if the passing duration is less than the minimum threshold in order to emit an elementary light beam with a constant light intensity as the motor vehicle moves toward the road sign.

6. The method of claim 1, wherein the increasing function of each control law is a power function of time and the exponent of which is associated with the passing duration associated with this control law.

\* \* \* \* \*